United States Patent [19]
Johnson

[11] 3,821,339
[45] June 28, 1974

[54] FILM SIZE CONTROL APPARATUS AND METHOD

[75] Inventor: Floyd C. Johnson, Lake Jackson, Tex.

[73] Assignee: The Dow Chemical Company, Midland, Mich.

[22] Filed: June 19, 1972

[21] Appl. No.: 264,705

[52] U.S. Cl. ................. 264/40, 264/89, 264/90, 264/95, 264/178 R, 425/71, 425/141, 425/172
[51] Int. Cl. .................. B29d 7/22, B29d 23/04
[58] Field of Search ..... 264/95, 89, 209, 40, 178 R, 264/237, 348, 90; 425/67-72, 326 R, 141, 142, 378-381, 162, 172

[56] References Cited
UNITED STATES PATENTS

| | | | |
|---|---|---|---|
| 2,451,986 | 10/1948 | Slaughter | 264/178 R |
| 2,955,321 | 10/1960 | Fortner et al. | 264/95 |
| 3,092,874 | 6/1963 | Fallwell | 264/40 |
| 3,125,616 | 3/1964 | Cook et al. | 264/40 |
| 3,438,088 | 4/1969 | Westbrook | 425/71 |

Primary Examiner—Jeffery R. Thurlow
Attorney, Agent, or Firm—Burke M. Halldorson

[57] ABSTRACT

A system of controlling the size of inflated, tubularly extruded film is taught based on a principle of monitoring the height of a meniscus formed by a quenching liquid applied circumferentially to cool the film, and which varies responsive to changes in diameter of the film. The system in its optimum form contemplates a continuous flow of inflating gas into the film, balanced with cyclic withdrawals of gas therefrom responsive to the detected height of the meniscus, such balance being sufficient to control the film under generally static operating conditions. In the event of erratic operating conditions, such as the sudden loss of gas pressure through pinholes or breaks in the film, the same is automatically detected by the resulting behavior of the meniscus, and replenishing gas in relatively large amounts is controllably injected into the film to quickly reestablish the proper size thereof. The system operates without contacting or in any way disturbing or marring the film.

10 Claims, 2 Drawing Figures

FILM SIZE CONTROL APPARATUS AND METHOD

BACKGROUND OF THE INVENTION

In order to manufacture film economically it is necessary to control the size of the film within fairly precise tolerance limits. More specifically, it is known in the art of tubularly extruding film to control the size thereof, responsive to the pressure internally inflating or supporting the film as it is being extruded. Oftentimes this control has been by manual adjustment of needle valves or the like which are set into pressure lines feeding gas pressure internally to the extruded tube.

However, to the extent that automatic control systems have been provided prior to this disclosure, the customary procedure is to continually monitor the diameter of the tube, or alternating the lay flat width thereof (after the tube has been collapsed), and translate such measurements electronically or otherwise to valve means controlling the supporting gas pressure within the tube.

The monitoring devices are usually in the form of two or more followers which move transversely to follow the sides of the inflated tube, or where the tube is collapsed, are trained to follow the opposite edges thereof. Such monitoring devices might be commonly termed as direct measuring systems in comparison, for example, to the indirect measuring system shown in U.S. Pat. No. 2,955,321. Here the size of the film is controlled indirectly, responsive to the height of a liquid in a reservoir surrounding the film. Nevertheless, it can be readily appreciated that the latter system is not particularly well adapted for reacting quickly to film size changes nor controlling the ultimate size of the film with a high degree of finesse.

It would be of advantage, therefore, if an improved film size control system were available that could efficiently control the size of tubularly extruded film, within precise tolerance limits, and without need to contact or otherwise disturb the film.

It would be of further advantage if such a system could replenish or withdraw supporting gas pressure from the tube as needed to maintain static operating conditions, and in the event of erratic conditions, such as a rapid loss of pressure, quickly and automatically detect such, and rapidly re-establish proper film size by the infusion of more than normal amounts of gas into the film.

These features and other advantages in accordance with the present invention are achieved through use of a film size monitoring system utilizing a meniscus of quenching liquid, forming as a result of a continuous stream of such liquid being applied to cool the film, as an indicator of film size changes. In the preferred embodiment of the invention, an electrically active probe is juxtapositioned with the meniscus, and is cyclically in contact and non-contact therewith depending on the size of the film. Most optimally a stream of inflating gas is constantly fed inwardly to the film, and is balanced by periodic gas withdrawals as controlled by the sensing probe to maintain a generally static film size. In the event of a sudden loss of pressure, such as through pinholes or other defects in the film, or erratic conditions in its manufacture, the system selectively detects such by failure of the film to regain static operating conditions within a predetermined amount of time, and provides for a rapid infusion of gas to quickly bring the film back to the static operating condition. In modified embodiments, a plurality of sensing probes are used to effect the results of this invention.

Further features and advantages in accordance with the present invention will become more apparent from the following specification taken in connection with the drawing wherein:

FIG. 1 is a side elevational view, with certain portions thereof in cross-section, illustrating apparatus embodying the general teachings and principles of this invention; and FIG. 2 is a view like FIG. 1 only showing a modified form of the invention.

DESCRIPTION OF THE PREFERRED EMBODIMENTS

Figure 1:
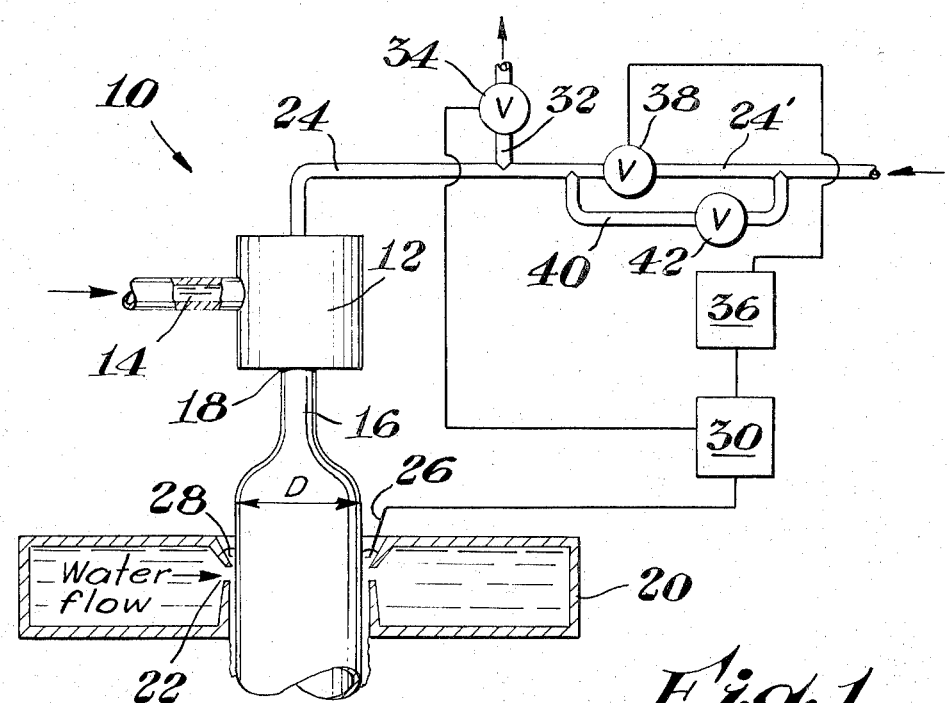

Referring now more particularly to the drawing, there is illustrated in FIG. 1, a film forming process and apparatus 10 of the general type contemplated herein. The apparatus 10 is shown largely by schematic representation, and includes a die 12 which receives a molten stream of polymer 14, and forms the stream into a film tube 16, the latter which issues downwardly from an annular extrusion orifice 18.

The film tube is then passed through an annular quenching ring or disc 20 which contains a replenishable source of a suitable quenching liquid, such as water. The quenching liquid is continuously applied to the surface of the freshly formed tube through an orifice or opening 22, extending about the inner circumference of ring 20.

The ultimate size of the tube is controlled by gas pressure fed inwardly thereto through a conduit or line 24 connecting centrally into die 12. The pressure or lack of pressure in line 24 is controlled in turn through an electrically active sensing probe 26, the tip of which is positioned in near proximity with quenching orifice 22. Depending on the diameter D of the tube, the probe is in contact or non-contact with a narrow annular meniscus 28 of quenching liquid which, because of surface tension, which may be affected to some degree by back pressure, forms above the quenching orifice.

Responsive to the condition of contact between probe 26 and meniscus 28, the probe fires an electronic control box or relay 30, which in turn, opens line 24 to a vacuum or near vacuum suction line 32, through operation of an electronic valve 34, such as a solenoid valve.

Opening of vacuum line 32 reduces the supporting pressure within the tube, eventually decreasing its diameter D, and accordingly reducing the height of meniscus 28, until such time as the non-contacting condition between the meniscus and probe 26 is reached.

A suitable time delay relay 36 is electrically connected to relay 30, and monitors the time the latter is in a non-firing condition, that is, the condition where the probe is in non-contact with the meniscus. In the event relay 30 is in the non-firing condition a predetermined amount of time, usually measured in seconds (i.e., about 1 to 10 seconds), the delay relay operates a second electronic valve 38. Valve 38 is associated with a short section 24' of line 24 which is bypassed by a line 40, the gas flow through the latter being preferably continuous, and controlled such as by a needle valve means as denoted at 42. Upon operation of valve 38, line section 24' is opened, increasing the rate of gas flow through line 24 thus expanding tube 16, and raising meniscus 28 until the contact position is reached, in turn firing relay 30. Firing of relay 30 deactivates delay relay 36, to automatically close valve 38 and the section of line 24', at the proper moment.

Under optimum operating conditions, the accumulative amount of gas flowing through bypass 40 over a certain time interval, is closely balanced with but slightly in excess of the total amount of gas taken off line 24, through the intermittent operation of vacuum line 32 over the same interval of time. The slight excess of flow, over that taken off line 24, replaces the gas pressure slowly lost from tube 16 under normal extrusion conditions. As may be appreciated, however, in an extrusion condition where the tube may give off entrained gas, to an extent that the tube would slowly grow if unchecked, the indicated balance would necessarily be reversed, in order to achieve a generally static tube size.

In any event, once the desired balance is achieved, through properly adjusting needle valve means 42, relay 30 cycles between the firing and non-firing conditions to maintain tube 16 within generally precise size tolerances. Attainment of the proper balance is indicated by the non-activation of delay relay 36; that is, relay 30 is cyclically into and out of the non-firing condition, but does not remain in the non-firing condition long enough to activate the delay relay.

It is only with intervening erratic operating conditions, resulting in a relatively sudden loss of pressure within the tube, that the balance is so upset that the shutting off of the vacuum line 32 does not bring the tube back to the proper size within the predetermined amount of time that must elapse before dealy relay 36 operates. The balance is then necessarily restored by operation of the delay relay, allowing for a rapid infusion of gas to quickly restore the tube to proper size, at which time the delay relay closes down line section 24', as signaled by contact of probe 26 with meniscus 28.

Figure 2:
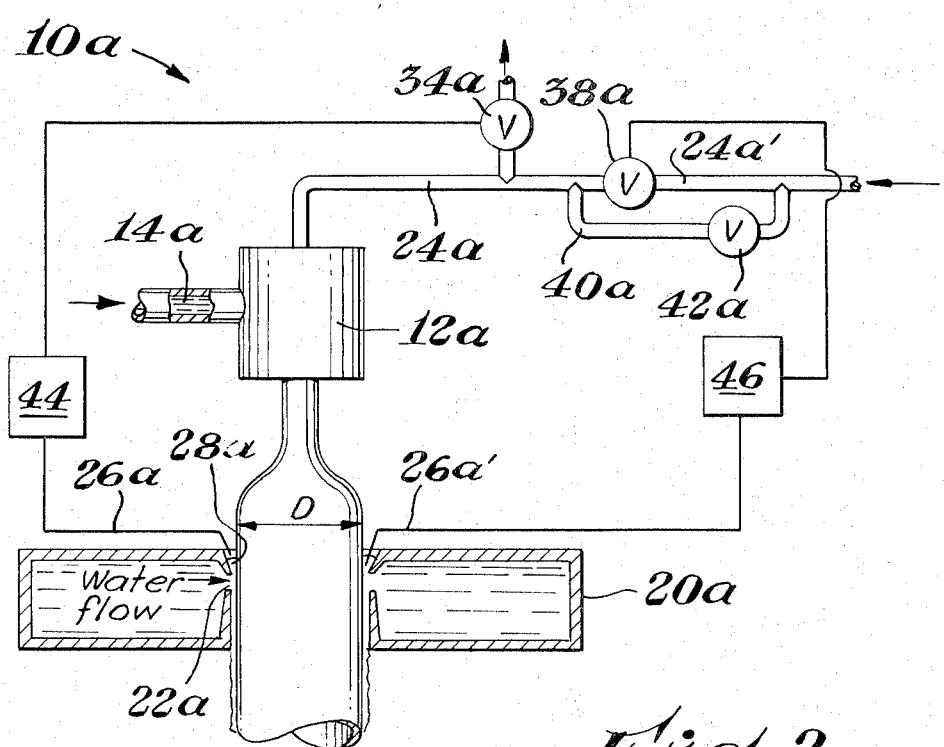

A modified embodiment of the invention is illustrated in FIG. 2 in the form of apparatus 10a. Apparatus 10a includes a pair of sensing probes 26a and 26a'. The probe 26a is offset slightly above probe 26a', and independently thereof operates vacuum line 34a, through electronic relay 44, responsive to periodic contact between it and meniscus 28a. The probe 26a' is normally in contacting association with the meniscus, except in the event of a sudden loss of pressure within tube 16a. In such condition, the probe 26a' signals a second electronic box or relay 46 to fire, which in turn opens line section 24a' through valve 38a. The rapid infusion of air quickly returns the tube to the proper size, and by doing so, re-establishes contact between probe 26a' and meniscus 28a, in turn, closing valve 38a at the proper moment. The intermittent release of pressure through the vacuum line is like before, sufficiently balanced with the inflow of gas through the bypass 40 a to take over tube size control, once the proper size has been re-established through operation of valve 38a.

Referring now to some of the general aspects of the disclosed apparatus, the same is particularly beneficial in start-up of extrusion of tubular film and thereafter to automatically maintain the size limits of the film, even though from time to time erratic operating conditions are encountered. In start-up, the tube is pinched off, sealing a certain volume of gas therein, and the tube started through a standard tube withdrawal or takeaway train. The latter is conventional and standard equipment used in practically all film tube extrusion lines, and thus is not shown herein. Once the tube is pinched off and started, the control system of this disclosure automatically brings the tube to proper size and maintains such size thereafter.

The sensing probes are preferably sharpened needles of electrically conductive material such as steel or aluminum. Normally the sharper the probe, the more sensitive it is to changes in the height of the meniscus as it sharply breaks the surface thereof, while minimizing any possible effect due to its disturbance upon the surface tension of the meniscus.

The quenching ring, as used in the practice of the teachings herein can vary in design. It is only necessary that the water ring be of a variety which forms a meniscus of quenching liquid upon the surface of the tube, which varies in height in response to changes in the diameter D of the tube. U.S. Pat. No. 3,337,663 illustrates in some further detail the benefits and workings of a quenching ring, and its teachings are hereby incorporated herein by reference.

As can well be understood, the attached drawing illustrates representatively, preferred embodiments of the invention. Accordingly it can be appreciated that various structural changes can be made therein, and are fairly within the scope of the general teachings, principles, and mode of operation of the apparatus and method disclosed herein.

What is claimed is:

1. An apparatus for producing a synthetic resinous thermoplastic film, the combination comprising, a film forming means for extruding a seamless film tube generally downwardly, and through an opening associated with a quenching means for applying a quenching liquid circumferentially to the surface of the tube, the quenching means being of a general type forming a meniscus of quenching liquid on the surface of the tube which varies in height responsive to the size of the tube, means for detecting variations in the height of said meniscus, a replenishing gas source communicating with the interior of the tube, a gas withdrawal source also communicating with the interior of the tube, one of said sources being variable, said detecting means controlling the operation of the variable gas source to control the pressure within said tube, and ultimately the size thereof, responsive to detecting movement in the height of said meniscus.

2. The apparatus of claim 1 wherein said detecting means comprises at least one probe means juxtapositioned with said meniscus, and which signals variations in the height thereof responsive to the conditions of contact and non-contact therewith.

3. The apparatus of claim 1 wherein said replenishing source comprises a constant gas feed source operating independently of said detecting means, said gas withdrawal source being intermittently varied by said detecting means for adjusting the gas pressure within said tube.

4. The apparatus of claim 3 including means supplemental to said constant feed means to increase the flow of gaseous fluid to the tube, said supplemental means being operated intermittently by said detecting means for increasing the flow of gaseous fluid to the tube.

5. The apparatus of claim 4 wherein said constant feed means is adjustable for generally balancing the flow of gas internally to the tube with the intermittent withdrawal thereof through said withdrawal source to maintain a generally static pressure within said tube, subject to operation of said supplemental means by the detecting means upon operating condition causing an upsetting of said balance.

6. The apparatus of claim 5 wherein said detecting means comprises at least one stationary probe means juxtapositioned with said meniscus, and which detects such variances by the conditions of contact and non-contact therewith.

7. In a method of producing a synthetic resinous thermoplastic tube, the cooperative steps comprising, continuously extruding a seamless film tube from a molten film forming synthetic resinous material, applying a quenching liquid circumferentially to the surface of the tube in such a manner as to form a meniscus on said surface, the height of which is sensitive to the size of the tube, controlling the gas pressure within the tube by balancing a continuous gas flow source with an intermittently operated gas withdrawal source so that the total gas flow of such sources maintains a generally static tube size, intermittently supplementing such continuous gas flow source responsive to a condition of loss of pressure within the tube causing a reduction in the size thereof beyond a certain predetermined lower size limit, said method including the further step of detecting movement in the height of said meniscus, the intermittent application of said withdrawal and supplementing steps being controlled responsive to said detecting step.

8. In a method of producing a plastic film material, the cooperative steps comprising, continuously extruding a seamless tube from a film forming synthetic resinous thermoplastic material, such extrusion being generally downwardly, thereafter, applying a quenching liquid circumferentially to the tube in a manner to form a meniscus on the surface thereof the height of which is sensitive to the size of the tube, controlling the internal pressure within the tube to control the size thereof, said controlling step comprising balancing a first continuous flow stream of gas with an intermittently varied second flow stream of gas to obtain a generally static control of the size of the film, one of said gas streams replenishing the gas within the tube and the other withdrawing gas, the intermittently varied flow stream being controlled responsive to the further step of detecting changes in the height of said meniscus.

9. The method of claim 8 wherein said controlling step comprises balancing a continuous flow stream of replenishing gas with an intermittently varied gas withdrawing step, said gas withdrawing step being by means of creating a vacuum induced withdrawal of gas.

10. The method of claim 8 wherein said method includes the further step of providing a supplemental infusion of gas into the tube, the operation of said infusion and withdrawal steps being controlled by said detecting means.

* * * * *